United States Patent
Luger et al.

(10) Patent No.: US 9,636,866 B2
(45) Date of Patent: May 2, 2017

(54) METHOD FOR INSPECTING MOUNTING SAFETY, DEVICE FOR CARRYING OUT THE METHOD AND DEVICE FOR ADHESIVE APPLICATION

(71) Applicant: Bayerische Motoren Werke Aktiengesellschaft, Munich (DE)

(72) Inventors: Andreas Luger, Furth im Wald (DE); Rainer Gschneidinger, Plattling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/966,523

(22) Filed: Dec. 11, 2015

(65) Prior Publication Data

US 2016/0096315 A1 Apr. 7, 2016

Related U.S. Application Data

(63) Continuation of application No. PCT/EP2014/059609, filed on May 12, 2014.

(30) Foreign Application Priority Data

Jun. 14, 2013 (DE) .................. 10 2013 211 129

(51) Int. Cl.
*B32B 41/00* (2006.01)
*B29C 65/52* (2006.01)
(Continued)

(52) U.S. Cl.
CPC .............. *B29C 65/524* (2013.01); *B05C 5/02* (2013.01); *B05C 11/101* (2013.01); *B29C 65/14* (2013.01);
(Continued)

(58) Field of Classification Search
CPC ... B29C 65/524; B29C 65/14; B29C 66/7212; B29C 66/742; B29C 65/4845;
(Continued)

(56) References Cited

U.S. PATENT DOCUMENTS 3,930,598 A * 1/1976 Slagle ................... B67D 3/00
137/266
6,083,558 A 7/2000 Bremont
(Continued)

FOREIGN PATENT DOCUMENTS

CN 201629343 U 11/2010
DE 196 45 000 A1 5/1998
(Continued)

OTHER PUBLICATIONS

International Search Report (PCT/ISA1210) issued in PCT Application No. PCT/EP2014/059609 dated Nov. 5, 2014 with English translation (Six (6) pages).

(Continued)

*Primary Examiner* — Michael N Orlando
*Assistant Examiner* — Joshel Rivera
(74) *Attorney, Agent, or Firm* — Crowell & Moring LLP

(57) ABSTRACT

A method for checking the security of installation of a joining element to be fixed to a component via an adhesive connection, wherein the adhesive is taken from an adhesive receptacle and is curable by exposure to light from a light emitter. The fill level of the adhesive receptacle is monitored and, upon reaching a lower threshold value of the determined level of the adhesive receptacle, a fluid connection device of a second adhesive receptacle having an adhesive fill level which is higher than that of the adhesive receptacle, is actuated to produce a fluid connection having an adhesive output device. The intensity of the light emitted from the light emitter is inspected by at least one sensor and a signal (Continued)

is output upon falling short of a threshold value of the light received by the sensor.

11 Claims, 3 Drawing Sheets

(51) Int. Cl.
*B05C 5/02* (2006.01)
*B29C 65/14* (2006.01)
*B05C 11/10* (2006.01)
*G01F 23/292* (2006.01)
*G05D 7/06* (2006.01)
*B29C 65/48* (2006.01)
*F16B 11/00* (2006.01)
*B29C 65/00* (2006.01)

(52) U.S. Cl.
CPC ......... *G01F 23/292* (2013.01); *G05D 7/0635* (2013.01); *B29C 65/4845* (2013.01); *B29C 66/7212* (2013.01); *B29C 66/742* (2013.01); *F16B 11/006* (2013.01)

(58) Field of Classification Search
CPC ... G01F 23/292; G05D 7/0635; B05C 11/101; B05C 5/02; F16B 11/006
USPC .................. 156/64, 350, 351, 368, 378, 379
See application file for complete search history.

(56) References Cited

U.S. PATENT DOCUMENTS

2011/0132520 A1  6/2011  Druke
2014/0020814 A1  1/2014  Dueke et al.

FOREIGN PATENT DOCUMENTS

DE  10 2009 057 332 A1  6/2011
DE  10 2011 009 259 A1  7/2012
GB           530563      12/1940
WO  WO 2012/100989 A1  8/2012

OTHER PUBLICATIONS

German-language Search Report issued in counterpart German Application No. 10 2013 211 129.0 dated Feb. 12, 2014 with partial English translation (Ten (10) pages).
"ONSERT Verbindung", Apr. 12, 2013, Retrieved from the Internet: URL: http//www.boellhoff.de/static/pdf/downloadcenter/DE/ONSERT-DE-0250.pdf [Retrieved on Dec. 10, 2015] pp. 5 and 7 (Two (2) pages).
"Tandem-Dosierer | SCA Schucker", Jan. 23, 2013, Retrieved from the Internet: URL: https://www.sca-schucker.com/content/produkte/dosiereinheiten/tandem-dosierer/index_ger.html [Retrieved on Dec. 10, 2015] (One (1) page).
SCA Pressmitteilung, "Presseinformaton: Tandemdosierer fuer die "endlose" Applikation von Kleberaupen", Jun. 1, 2014, Bretten, Seite 1 von 4, May 2014, Retrieved from the Internet: URL: http://www.turmpresse.de/sca/pdf/SCA_1404_Tandemdosierer.pdf [Retrieved on Dec. 10, 2015] (Four (4) pages).
WDT Produktblatt, "Umschaltautomatik", Jun. 2002, Retrieved from the Internet: URL: http://www.2r-solutions.ch/downloads/pb_umschaltautomatik.pdf [Retrieved on Dec. 10, 2015] (One (1) page).
Wiwa Vulkan. Prospekt, "Technische Aendreungen vorbehalten", Wiwa Wilhelm Wagner GmbH & Co. KG, W164044, Aug. 2005, Retrieved from the Internet: URL: http://www.wiwa.de/fileadmin/pdf/prospekte_de/wiwa_vulkan_205x279_D.pdf [Retrieved on Dec. 10, 2015] (Eight (8) pages).
Chinese-language Office Action issued in counterpart Chinese Application No. 201480024686.6 dated Jan. 18, 2017 with English translation (Sixteen (16) pages).

* cited by examiner

METHOD FOR INSPECTING MOUNTING SAFETY, DEVICE FOR CARRYING OUT THE METHOD AND DEVICE FOR ADHESIVE APPLICATION

CROSS REFERENCE TO RELATED APPLICATIONS

This application is a continuation of PCT International Application No. PCT/EP2014/059609, filed May 12, 2014, which claims priority under 35 U.S.C. §119 from German Patent Application No. 10 2013 211 129.0, filed Jun. 14, 2013, the entire disclosures of which are herein expressly incorporated by reference.

BACKGROUND AND SUMMARY OF THE INVENTION

The present invention relates to a method for checking the security of installation of a joining element which is to be fixed to a component by way of an adhesive connection, wherein the adhesive is withdrawn from an adhesive receptacle and can be cured by irradiation with light from a light emitter. The invention also relates to a device for carrying out the method, having a joining head which is arranged on a robot arm, and having a gripper for withdrawing joining elements from the device, wherein the joining elements are arranged in storable fashion in the device and can be conveyed by an advancing device into a dispensing position.

The invention also relates to a device having a first and a second adhesive receptacle, which are connected by way of a respective fluid line to an adhesive applicator.

A generic device for accommodating joining elements is often a store or a magazine which can, in particular, be fastened to a joining head.

A generic device having a first and a second adhesive receptacle is often a provision or loading station with a dispenser.

The joining elements may, as seen in cross section, have a T-shaped form with a disk and a bolt, wherein an adhesive can be applied to the disk. Thus, the disk of the T-shaped joining element can be fixed to the surface of a component by way of an adhesive connection, and a second component can be fixed to the bolt by way of a screw connection or a snap-action connection.

In the manufacturing sector, in particular in the series manufacture of motor vehicles, aircraft, light aircraft or vehicles of any other type, use is nowadays increasingly made of components, for example structural components in the bodyshell structure, composed of so-called fiber composite materials. A fiber composite material of said type is, for example, carbon fiber-reinforced plastic, also referred to as CFRP. The advantages of CFRP in relation to metals include, inter alia, a low mass with a high strength. For the connection of such CFRP components to metallic components, however, special requirements must be observed. CFRP components cannot readily be provided with a bore and connected to a metal component, as the connecting point between the CFRP and the metal component is susceptible to corrosion.

Therefore, for the connection of a CFRP component to a metal component, use is normally made of a T-shaped joining element with a disk composed of plastic and with a threaded bolt composed of metal, wherein the disk is adhesively bonded to the CFRP component, and the threaded bolt is screwed to the metal component.

DE 10 2011 009 259 A1 discloses a placement system which has a joining head for applying joining elements to a component by way of an adhesive connection. Furthermore, this document discloses a method for mounting joining elements onto the component.

A joining head of this type normally has a gripper with a light emitter, a pivot arm, a magazine and a fastening plate. In this case, the joining head may be fastened by way of the fastening plate to a robot arm. The gripper with the light emitter is fastened to the pivot arm, which gripper individually withdraws the joining elements that are stored in storage rails in the magazine. The pivot arm of the joining head then places the individually withdrawn joining element onto a component provided therefore. The light emitter subsequently ensures that the adhesive that is applied to the joining element is cured by irradiation with light.

After the withdrawal of the joining element from the dispensing position, another joining element of the storage rail is guided into the dispensing position of the magazine. This follow-up transportation or follow-up feed of a further joining element into the dispensing position of the magazine is performed by way of an expanding spring.

When the final joining element has been withdrawn from the magazine by the pivot arm by way of the gripper and applied to the component surface, the magazine of the joining head can subsequently be coupled to a loading station.

After the coupling process is complete and the multiplicity of joining elements have been transferred from the loading station to the magazine, the pivot arm of the joining head can, in the manner described above, resume the process of withdrawing joining elements from the magazine and applying them onto the component provided therefore.

In the method mentioned above for applying a T-shaped joining element onto a component surface, adhesive is initially applied to the joining elements. The joining elements are placed into the magazine. The magazine is subsequently moved in its longitudinal direction. And, the gripper withdraws a joining element from the magazine in order to mount it on the component, whereafter the curing source is finally activated.

DE 10 2009 057 332 A1 discloses a loading station with a dispenser, in which the application of adhesive to the disk of the T-shaped joining element is performed by use of the dispenser or the adhesive applicator. The joining elements can be buffer-stored in rails of a buffer store of the loading station and/or moved into a magazine.

The magazine takes on the T-shaped joining elements from the loading station, wherein the joining element can, in the dispensing position of the magazine, be manually or automatically withdrawn from the magazine by the gripper and applied manually, or automatically by way of a robot, to the component surface at its predetermined processing position.

The follow-up transportation or follow-up feed of a further joining element into the dispensing position of the magazine is performed by way of a spring-preloaded slide.

In the abovementioned method for applying a T-shaped joining element to a component surface, adhesive is applied to the joining elements. The joining elements are placed into a buffer store or directly into a magazine. The magazine and gripper are pivoted such that the gripper can withdraw a joining element from the magazine and apply said joining element to the component surface. And, the joining element is finally irradiated with light such that the adhesive cures.

The described methods for fastening joining elements to a component surface have the disadvantage that they do not have any steps for checking quality or security of installation during the course of the fastening process. The methods are therefore susceptible to errors and exhibit low process reliability.

The present invention is therefore based on the object of providing a method for applying joining elements to a component, which method, with regard to industrial series manufacture, provides steps during the course of the fastening process for checking the security of the installation, for quality assurance and for increasing process reliability and reducing susceptibility to errors. It is also sought to provide a device for carrying out the method and for arranging on a joining head of a robot arm, by which device reduced susceptibility to errors and increased process reliability are achieved with regard to the application of joining elements to components in industrial series manufacture.

It is a further object of the present invention to provide a device for applying adhesive, by which device process reliability is increased and downtime is reduced.

This and other objects are achieved according to the method, the device for carrying out the method, and a device for applying adhesive, in accordance with embodiments of the present invention.

The invention provides a method for checking the security of installation of a joining element which is to be fixed to a component by way of an adhesive connection, wherein the adhesive is withdrawn from an adhesive receptacle and can be cured by irradiation with light from a light emitter. The method includes the following acts:

a) the fill level of the adhesive receptacle is monitored and, if a lower threshold value of the detected fill level of said adhesive receptacle is reached, fluidic connection device of a second adhesive receptacle, whose fill level of adhesive is higher than that of the former adhesive receptacle, is actuated in order to produce a fluidic connection to an adhesive dispenser;

b) the intensity of the light radiated by the light emitter is checked by at least one sensor, and a signal is output if a threshold value of the light received by the sensor is undershot.

The checking of the fill level of the adhesive receptacle with regard to a lower threshold value makes it possible for the impending empty state of the adhesive receptacle to be identified in good time. When the threshold value of one adhesive receptacle is reached, a switch to a second adhesive receptacle is performed. The switch to the second adhesive receptacle may be performed, for example, by way of a pneumatic valve and serves the purpose of avoiding standstill times and thus an interruption in the execution of the method.

Through the checking of the light intensity of the light and the outputting of a signal upon a threshold value being reached, reliable curing of the adhesive during their radiation with light is achieved.

The two processes, of threshold value monitoring of the adhesive receptacle and checking of the light radiated by the light emitter, are necessary at least for uninterrupted application of adhesive to the joining elements and secure fastening of the joining elements to the component.

In one advantageous refinement of the method for checking security of installation, it is provided that the adhesive is withdrawn from, in each case, one of the two adhesive receptacles whose detected fill level exceeds the lower threshold value.

The purpose of the adhesive being withdrawn from, in each case, one of the adhesive receptacles consists in preventing a situation in which, during the execution of the fastening method, an empty state of the adhesive receptacle can arise prematurely and the joining process is interrupted. The method is thus suitable for series manufacture.

It is therefore not sufficient to provide one adhesive receptacle which, during normal operation, provides adequate adhesive for the execution of the fastening method. For uninterrupted operation with adhesive application, it is necessary for the state of the adhesive receptacle, for example the fill level and the pressure, to be monitored and, if necessary, for a switch to be made to a second adhesive receptacle.

In one advantageous refinement of the method for checking security of installation, it is provided that monitoring of the two adhesive receptacles with regard to the lower threshold value being reached is performed by way of at least one sensor.

In one advantageous refinement of the method for checking security of installation, it is provided that, for each joining point on the component, joining parameters for the joining element which is to be fixed at the joining point by way of the adhesive connection are defined.

To allow for different spatial orientation of joining points on the CFRP component, it is provided that different joining parameters can be defined for joining elements which are to be mounted in different spatial orientations.

These joining parameters are, for example, the orientation of the pivot arm and the mounting pressure on the joining element, and the force threshold value and the mounting time implemented for the mounting of the joining element onto the component.

In one advantageous refinement of the method, it is provided that the checking of the intensity of the light radiated by the light emitter and of the temperature is performed during an ongoing process of irradiation of the joining element.

To check the intensity of the light radiated by the light emitter during a process of irradiation of a joining element, the light may be captured, and fed to a spectrometer, at a defined distance from the outlet surface of the light emitter. In this way, the light intensity of the light radiated by the light emitter can be measured, and compared with a threshold value of the light intensity, during the irradiation of the joining element.

In one advantageous refinement of the method, it is provided that, after being irradiated with light, the joining element is subjected to a predetermined tensile force by way of a gripper.

To check whether the adhesive at the joining point has cured after the process of irradiation by the light emitter, an inspection is performed by way of the bolt of the joining element being subjected to a tensile force after the curing of the adhesive. In this case, low tensile forces are adequate, as these enable situations in which curing of the adhesive has not occurred to be identified, and at the same time, no damage is caused to joining elements that have been mounted correctly.

In one advantageous refinement of the method, it is also provided that the checking of the intensity of the light radiated by the light emitter is performed at predetermined time intervals.

The predetermined time intervals for the checking of the intensity of the radiated light may be stored in a control unit as a number of irradiation processes.

The measurement of the intensity of the light radiated by the light emitter may be performed between individual irradiation processes. In this case, the light emitter is activated for a certain time period, and the light intensity is detected by way of a sensor and compared with a threshold value.

The invention also provides a device for carrying out the method, which device is provided for arrangement on a joining head of a robot arm with a gripper for withdrawing joining elements from the device, wherein the joining elements are arranged in storable fashion in the device and can be conveyed by an advancing device into a dispensing position, and wherein the advancing device has at least one actuating cylinder which has an actuating piston which can be acted on by way of fluid and which conveys the joining elements.

For the purposes of conveying the joining elements in the direction of the dispensing position, the actuating piston is acted on with a fluid via feed lines. By being acted on with fluid, the actuating piston is caused to move in the advancing direction in the axial longitudinal direction of the actuating cylinder.

In this way, it is possible for the device for accommodating joining elements to provide permanently exact and precisely reproducible advancing movements of the actuating piston, in particular over a very large number of successive advancing movements, such as is customarily the case in the series manufacture of structural and functional parts. Thus, the joining elements are always conveyed in the direction of their dispensing position in an exact and reliable manner.

The invention furthermore provides a device having a first and a second adhesive receptacle, which are connected by way of a respective fluid line to an adhesive applicator, wherein each fluid line has a fluid shut-off valve, and the fluid lines issue into a common feed line to the adhesive applicator.

The use of two adhesive receptacles, the monitoring of the fill level of an adhesive receptacle with regard to a threshold value and the switching to a second adhesive receptacle in the event of the threshold value being undershot make it possible for the device for adhesive application to operate in uninterrupted fashion. In this way, the ongoing operation of adhesive application does not need to be interrupted, such as in the case of operation using only one adhesive receptacle. This in turn contributes to an increase in process reliability.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
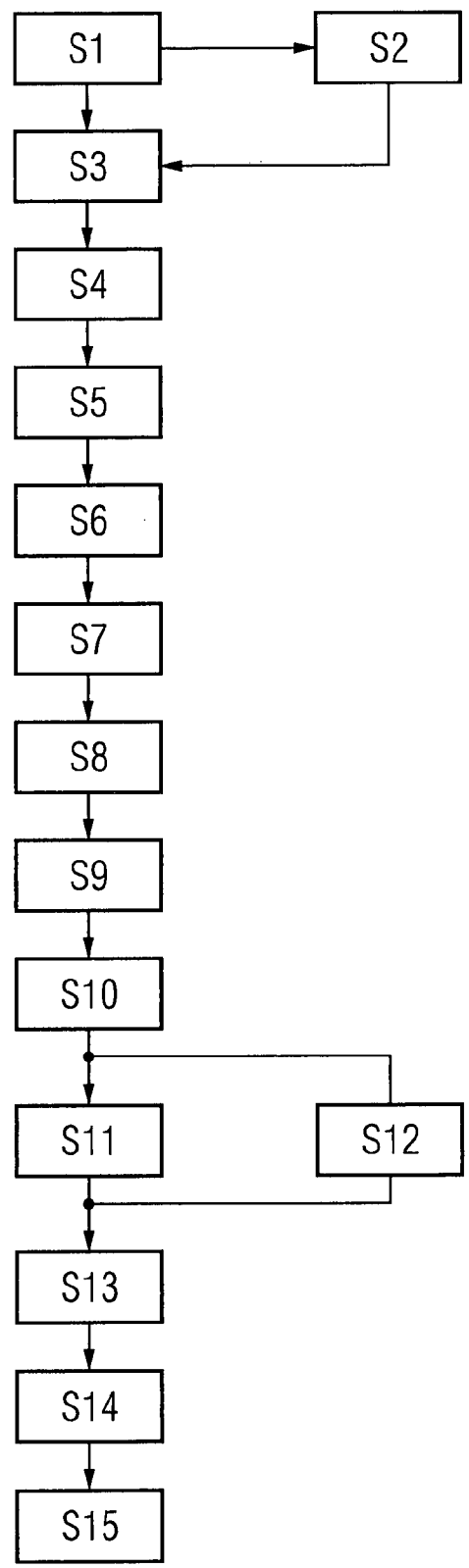
FIG. 1 is a flow diagram of a preferred embodiment of the method for checking security of installation.
Figure 2:
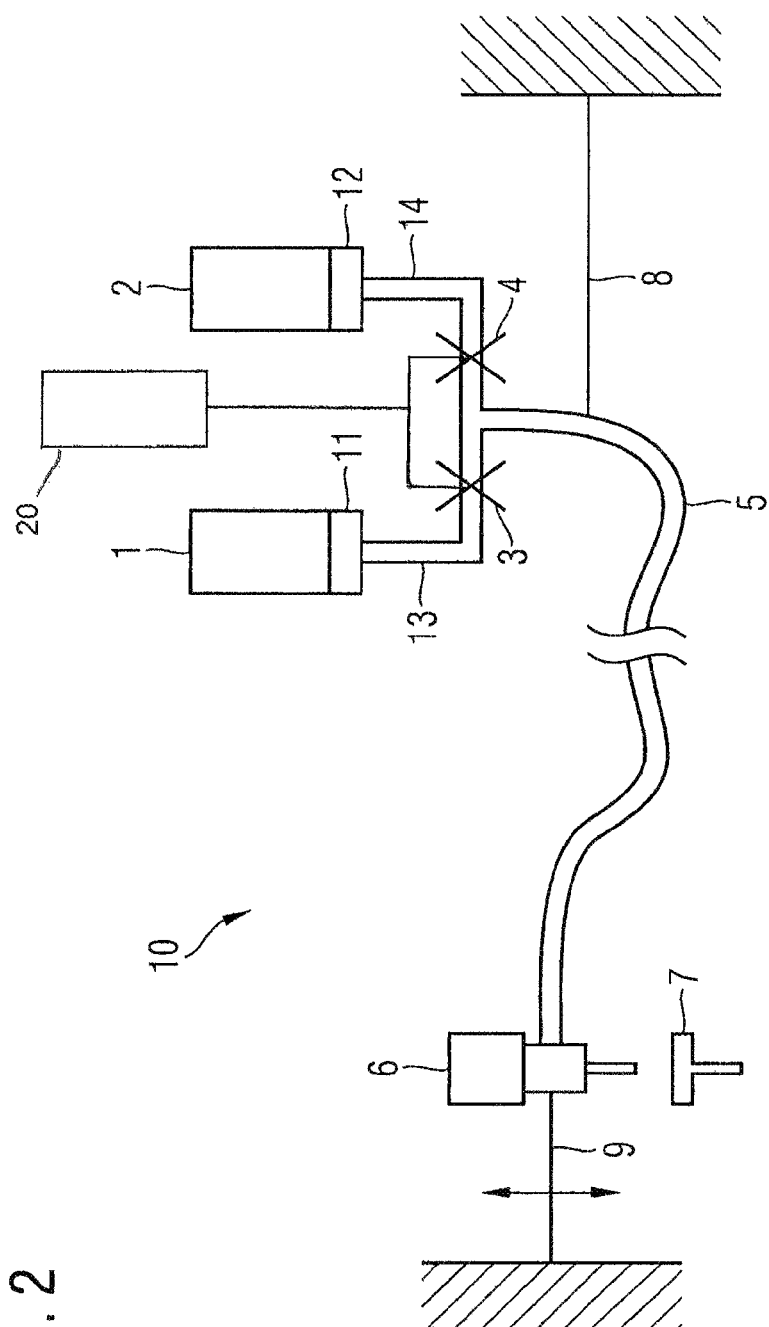
FIG. 2 is a schematic illustration of the device for adhesive application.

The steps of a method for checking security of installation will be discussed on the basis of FIG. 1 of the drawing in reference to the adhesive application device of FIG. 2.

In one embodiment of the invention, for the continuous application of adhesive to the disks of the T-shaped joining elements 7 (FIG. 2), the fill level of the adhesive receptacle 1 is monitored with regard to a lower threshold value 11 by a sensor. For as long as the fill level of the adhesive receptacle 1 is higher than the lower threshold value 11, adhesive for application to the joining elements 7 is withdrawn from the adhesive receptacle 1 (S1).

When the lower threshold value 11 is reached or undershot, a controller 20 causes the fluid shut-off valve 3 to close and the fluid shut-off valve 4 to open such that adhesive is withdrawn from the adhesive receptacle 2 (S2). Continuous withdrawal of adhesive from, in each case, one of the adhesive receptacles 1, 2 is made possible in this way (S3).

The application of the adhesive to the joining elements 7 is performed by way of the adhesive applicator 6 of the device 10 for adhesive application (S4).

During the steps described above, parameters such as the fill level or pressure in the adhesive receptacles 1, 2 may be monitored by use of sensors and controlled by way of a stated controller and visualized by way of a screen of the controller. Further parameters such as dosing speed or time duration of the application of adhesive to the joining element 7 can be checked and set by way of the screen of the controller. Furthermore, parameters such as the density and the weight of the adhesive can be set or checked by way of the controller.

The joining elements 7 may then initially be buffer-stored in storage rails (not illustrated in any more detail) of the device 10 for adhesive application and/or placed into a magazine (likewise not illustrated in any more detail) (S5).

In a subsequent step, the gripper fastened to a pivot arm of a joining head is moved to the magazine in order to withdraw a joining element 7 from the dispensing position of the magazine. For the stated withdrawal of the joining element 7, it is also possible for the magazine to be moved to the gripper, such that the gripper and magazine face one another such that the gripper can withdraw the joining element 7 from the magazine (S6).

The gripper then withdraws the joining element 7 from the magazine (S7), and the magazine is moved back into its initial position (S8).

The gripper of the pivot arm is subsequently oriented in the joining direction. Depending on the spatial orientation of the joining point on the component, the force of gravity may act entirely or partly in the joining direction or oppositely to the joining direction. In a joining point management facility of the controller, parameters for each joining point can be set in accordance with the individual position of said joining point on the component (S9).

The parameters for each joining point that can be set and checked by way of the controller include not only the orientation of the pivot arm or the mounting pressure but also the force threshold value and the mounting time duration for the joining element 7.

Taking into consideration the parameters set for the respective joining point, the joining element 7 is finally mounted at the joining point provided therefore (S10).

The gripper, which is fastened to the pivot arm and which has a light emitter (not illustrated in any more detail), serves for curing the adhesive situated on the disk of the T-shaped joining element 7 by way of irradiation with light from the light emitter (S11).

The light emitter may, for example, surround the gripper in circular fashion and may be composed of one LED or of a light source which outputs light of a defined wavelength.

The parameters which can be monitored by way of sensors, or set and visualized by way of the controller, during the irradiation or illumination of the joining element 7 by the light emitter are, for example, the temperature of the light emitter and the time duration and the light intensity of the light radiated by the light emitter.

During operation, that is to say during the irradiation of the joining element 7 by way of the light emitter, it is possible for light to be captured by way of a sensor which is arranged at a defined distance from the light emitter, and for the light intensity generated by the light emitter to be checked by way of spectroscopy. Furthermore, the temperature of the light emitter may be checked with regard to an upper threshold value. In the event that the light intensity falls below a lower defined threshold value or the temperature exceeds an upper threshold value, an error signal is output to the controller. For as long as the light intensity exceeds the threshold value and the temperature is below its threshold value, normal operation takes place during the irradiation of the joining element 7 (S12).

After the irradiation by the light emitter has been performed, an inspection of the joining element 7 by pulling is performed. For this purpose, after the adhesive has cured, the gripper pulls on the bolt of the joining element 7 with a low tensile force that can be set by way of the controller. The low tensile force is sufficient to detach the joining element from the component again in the event that the adhesive has not correctly cured. By contrast, if curing has taken place correctly, the low tensile force does not lead to any damage to the adhesive connection (S13).

By way of the controller, parameters for the inspection of the joining element 7 by pulling, such as for example the tensile force, the force threshold value thereof and the time for the exertion of the tensile force can be set.

Once the inspection by pulling has been performed, the gripper of the pivot arm releases the joining element 7 again (S14).

After a variable number of irradiation processes, which number can be set in the controller, a cyclic quality measurement of the light intensity of the light radiated by the light emitter can be performed. For this purpose, the light emitter is activated for a certain period of time, the light intensity is detected by way of a sensor, and the determined actual value of the light intensity is compared with a target value of the light intensity. If the actual value is lower than the target value, an error signal is output to the controller. The method is otherwise continued (S15).

To carry out the method, the invention has a device, having a joining head arranged on a robot arm, and having a gripper for withdrawing joining elements 7 from the device. The joining elements 7 are arranged in storable fashion in the device and can be conveyed by an advancing device into a dispensing position. The advancing device has at least one actuating cylinder with an actuating piston which can be acted on by way of fluid and which conveys the joining elements 7.

Figure 3:
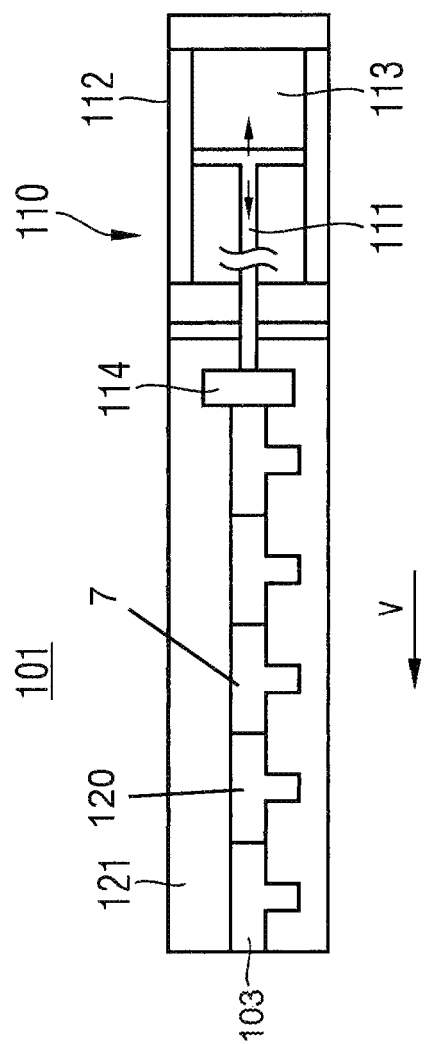
FIG. 3 is a schematic illustration of a device for carrying out the method, the device being arranged on a joining head.

As can be seen from FIG. 3, in the device 101, a multiplicity of joining elements 7, in particular T-shape adhesive bolts, are arranged in a guide body 121 and can be conveyed in the direction of a dispensing position 103.

From a dispensing position 103, the joining elements 7 can then, by way of the gripper, be withdrawn from the guide body 121 or from the receiving groove 120 and applied to a provided component surface.

To convey the joining elements 7 in the direction (arrow V) of the dispensing position, an advancing device 110 is provided.

The advancing device has an actuating cylinder 112 and an actuating piston 111. The actuating cylinder 112 has a piston chamber 113 into which a fluid in the form of compressed air can be introduced.

For the movement of the joining elements 7 in the direction of the dispensing position, the actuating piston 111 has, in an axial longitudinal direction, a piston rod head 114.

The actuating piston 111 is arranged in the actuating cylinder 112 so as to be movable in the axial longitudinal direction of the actuating cylinder 112, wherein the actuating piston 111 is actuated by way of the fluid that can be introduced into the chamber 113. Force is transmitted to the joining elements 7, in order to convey them in the direction of the dispensing position, by way of the piston rod head 114.

The fluid is, in this case, preferably a gaseous and/or liquid medium, such as for example oil or air, wherein compressed air is preferably used.

Furthermore, the invention provides a device 10 for applying adhesive. The device 10 has adhesive receptacles 1, 2, the fill level of which is checked with regard to a lower threshold value 11, 12 by way of sensors. The adhesive passes from the adhesive receptacles 1, 2 to an adhesive applicator 6 via fluid lines 13, 14, which issue into a common feed line 5.

Between the adhesive receptacle 1, 2 and the common feed line 5, the fluid lines 13, 14 have fluid shut-off valves 3, 4. The fluid shut-off valve 3, 4 may, for example, be a ball valve or a pneumatic valve.

The feed line 5 may, for example, be fastened by way of a fixed mounting 8 to a surface, and the feed line 5 may be in the form of a flexible hose.

The adhesive applicator 6, which is supplied with adhesive via the flexible hose, can be fastened to a surface, for example a wall, by way of a vertically movable mounting 9.

The vertically movable mounting 9 of the adhesive applicator 6 allows the adhesive applicator 6 to be raised and lowered, such that the adhesive applicator 6 can be positioned exactly over the head of the joining element 7 for the application of adhesive.

By way of the controller, an adhesive receptacle 1, 2 for adhesive to be withdrawn from can be selected. By virtue of the threshold value of the adhesive receptacle 1, 2 being monitored and a switch being made to the second adhesive receptacle 2, 1 in the event of the threshold value being undershot, it is possible for adhesive to be withdrawn from the adhesive receptacles 1, 2, and applied to the joining elements 7, in continuous fashion (see steps S1 to S4 as described above).

With regard to features of the invention that are not discussed in any more detail above, reference is furthermore expressly made to the claims and to the drawing.

LIST OF REFERENCE NUMERALS

1 Adhesive receptacle
2 Adhesive receptacle
3 Fluid shut-off valve
4 Fluid shut-off valve
5 Feed line
6 Adhesive applicator
7 Joining element
8 Fixed mounting
9 Movable mounting
10 Device
11 Threshold value
12 Threshold value
13 Fluid line
14 Fluid line
101 Device
103 Dispensing position 110 Advancing device
111 Actuating piston
112 Actuating cylinder
113 Piston chamber
114 Piston rod head
120 Receiving groove
121 Guide body The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for checking security of installation of a joining element to be fixed to a component via an adhesive connection by a joining apparatus having first and second adhesive receptacles arranged to supply an adhesive to an adhesive applicator, the adhesive applicator being configured to apply the adhesive to the joining element prior to affixing the joining element to the component and curing the adhesive by irradiation with light from a light emitter, the method comprising the acts of:
    during operation of the joining apparatus monitoring a fill level of each of the first and second adhesive receptacles with a joining apparatus controller;
    determining based on analysis of the adhesive receptacle monitoring by the controller if a lower threshold value of the monitored fill level of the first adhesive receptacle is reached;
    determining, if the lower threshold value of the first adhesive receptacle is determined by the controller to have been reached, if the monitored fill level of the second adhesive receptacle is higher than the monitored fill level of the first adhesive receptacle;
    if the controller determines that the monitored fill level of the second adhesive receptacle is higher than the monitored fill level of the first adhesive receptacle, controlling using the controller actuation of a fluidic connection device of the second adhesive receptacle to establish a fluid connection between the second adhesive receptacle and the adhesive applicator so as to provide the adhesive from the second adhesive receptacle to the adhesive applicator before the first adhesive receptacle is empty;
    during operation of the joining apparatus monitoring using the controller at least one sensor configured to detect an intensity of the light radiated from the light emitter; and
    if the controller determines that the monitored light intensity is lower than a threshold value of the light received by the at least one sensor, outputting by the controller a low light intensity signal indicating a need for corrective action.

2. The method according to claim 1, wherein the controller is configured to permit withdrawing the adhesive from either of the first and second adhesive receptacles having a detected fill level exceeding the lower threshold value.

3. The method according to claim 1, wherein monitoring of the first and second adhesive receptacles with regard to the lower fill level threshold value being reached is performed by way of at least one fill level sensor.

4. The method according to claim 2, wherein monitoring of the first and second adhesive receptacles with regard to the lower fill level threshold value being reached is performed by way of at least one fill level sensor.

5. The method according to claim 1, further comprising the act of:
    controlling using the controller the joining of the joining element to the component at a joining point on the component based on predetermined joining parameters.

6. The method according to claim 1, wherein the act of detecting the intensity of the light radiated by the light emitter is carried out during irradiation of the adhesive applied to the joining element.

7. The method according to claim 1, further comprising the act of:
    after irradiation of the adhesive applied to the joining element, applying a predetermined tensile force element to the adhesive between the joining element and the component using a gripper controlled by the controller.

8. The method according to claim 1, wherein the act of detecting the intensity of the light radiated by the light emitter is performed at predetermined time intervals.

9. The method according to claim 6, wherein the act of detecting the intensity of the light radiated by the light emitter is performed at predetermined time intervals.

10. A device for checking security of installation of a joining element to be fixed to a component via an adhesive connection, the device comprising:
    an adhesive applicator;
    first and second adhesive receptacles arranged to supply an adhesive to the adhesive applicator;
    a magazine configured to hold a plurality of joining elements in a dispensing position;
    a joining head arranged on a robot arm;
    a gripper connected to the joining head, the gripper being configured to withdraw a one of the plurality of joining elements at the dispensing position from the magazine;
    an advancing device configured to convey the plurality of joining elements into the dispensing position, the advancing device having an actuating cylinder having a fluid-actuated actuating piston configured to advance the joining elements toward the dispensing position;
    a light emitter configured to emit light to cure the adhesive applied from the adhesive applicator to the one of the plurality of joining elements withdrawn from the magazine by the gripper; and
    a controller configured to control
        the adhesive applicator to apply the adhesive to the plurality of joining elements,
        the gripper to withdraw the one of the plurality of joining elements from the magazine and position the one of the plurality of joining elements at a joining position on the component with the adhesive between the joining element and the component, and
        the light emitter to irradiate the adhesive between the joining element and the component with light sufficient to cure the adhesive,
    wherein the controller is further configured to
        monitor a fill level of each of the first and second adhesive receptacles;
        determine based on analysis of the adhesive receptacle monitoring if a lower threshold value of the monitored fill level of the first adhesive receptacle is reached;
        determine, if the lower threshold value of the first adhesive receptacle is determined to have been reached, if the monitored fill level of the second adhesive receptacle is higher than the monitored fill level of the first adhesive receptacle;

if the monitored fill level of the second adhesive receptacle is higher than the monitored fill level of the first adhesive receptacle, controlling using the controller actuation of a fluidic connection device of the second adhesive receptacle to establish a fluid connection between the second adhesive receptacle and the adhesive applicator so as to provide the adhesive from the second adhesive receptacle to the adhesive applicator before the first adhesive receptacle is empty;

monitor at least one sensor configured to detect an intensity of the light radiated from the light emitter; and output a low light intensity signal indicating a need for corrective action if the monitored light intensity is lower than a threshold value of the light received by the at least one sensor.

11. A device, comprising:
a first adhesive receptacle;
a second adhesive receptacle;
an adhesive applicator, the first and second adhesive receptacles being connected via a respective fluid line to the adhesive applicator;
a controller;
a fluid shut-off valve arranged in each respective fluid line; and
a common feed line coupled to the adhesive applicator, wherein the respective fluid lines issue into the common feed line downstream of the fluid shut-off valves,
wherein
the controller is configured to
monitor a fill level of each of the first and second adhesive receptacles;
determine based on analysis of the adhesive receptacle monitoring if a lower threshold value of the monitored fill level of the first adhesive receptacle is reached;
determine, if the lower threshold value of the first adhesive receptacle is determined to have been reached, if the monitored fill level of the second adhesive receptacle is higher than the monitored fill level of the first adhesive receptacle; and
if the monitored fill level of the second adhesive receptacle is higher than the monitored fill level of the first adhesive receptacle, controlling using the controller actuation of the fluid shut-off valve in the fluid line of the second adhesive to establish a fluid connection between the second adhesive receptacle and the adhesive applicator so as to provide the adhesive from the second adhesive receptacle to the adhesive applicator before the first adhesive receptacle is empty.

* * * * *